US011940419B2

(12) United States Patent
Shehab

(10) Patent No.: US 11,940,419 B2
(45) Date of Patent: Mar. 26, 2024

(54) APPARATUS, SYSTEM, AND METHOD FOR ULTRASONIC INSPECTION OF A VARIABLE ANGLE JOINT

(71) Applicant: The Boeing Company, Chicago, IL (US)

(72) Inventor: Kareem Shehab, Seattle, WA (US)

(73) Assignee: The Boeing Company, Arlington, VA (US)

( * ) Notice: Subject to any disclaimer, the term of this patent is extended or adjusted under 35 U.S.C. 154(b) by 356 days.

(21) Appl. No.: 17/368,557

(22) Filed: Jul. 6, 2021

(65) Prior Publication Data
US 2022/0011274 A1  Jan. 13, 2022

Related U.S. Application Data

(60) Provisional application No. 63/049,825, filed on Jul. 9, 2020.

(51) Int. Cl.
G01N 29/265 (2006.01)
B25J 9/16 (2006.01)
G01N 29/04 (2006.01)
G01N 29/22 (2006.01)
G01N 29/28 (2006.01)
G01N 35/00 (2006.01)

(52) U.S. Cl.
CPC .......... G01N 29/265 (2013.01); B25J 9/1694 (2013.01); G01N 29/04 (2013.01); G01N 29/225 (2013.01); G01N 29/28 (2013.01); G01N 35/0099 (2013.01); G01N 2291/023 (2013.01); G01N 2291/0289 (2013.01)

(58) Field of Classification Search
CPC .... G01N 29/265; G01N 29/04; G01N 29/225; G01N 29/28; G01N 35/0099; G01N 2291/023; G01N 2291/0289; G01N 2291/2638; G01N 29/043; B25J 9/1694
See application file for complete search history.

(56) References Cited

U.S. PATENT DOCUMENTS

| 7,263,889 | B2 | 9/2007 | Kennedy et al. |
| 7,836,768 | B2 | 11/2010 | Young et al. |
| 9,746,447 | B2 | 8/2017 | Fetzer et al. |
| 10,520,474 | B2 | 12/2019 | De Frutos-Galindo et al. |
| 10,690,632 | B2 | 6/2020 | Tissenier et al. |
| 10,782,268 | B2 | 9/2020 | Kahmann et al. |
| 11,035,831 | B1 | 6/2021 | Fetzer et al. |
| 2009/0107244 | A1 | 4/2009 | Fetzer et al. |

(Continued)

FOREIGN PATENT DOCUMENTS

EP  2159576  3/2010

Primary Examiner — Xin Y Zhong
(74) Attorney, Agent, or Firm — Kunzler Bean & Adamson

(57) ABSTRACT

Disclosed herein is an apparatus for ultrasonic inspection. The apparatus comprises, in certain examples, a base, a lower coupler block slidably coupled to the base such that the base is translationally movable relative to the lower coupler block, and a pair of wings rotatably coupled to the lower coupler block at a wing pivot point and pivotable between a first angle and a second angle. In certain examples, the apparatus also includes a sensor carriage located within the base and slidably coupled to the base such that the sensor carriage is translationally movable relative to the base.

20 Claims, 14 Drawing Sheets

(56) References Cited

U.S. PATENT DOCUMENTS

| | | | |
|---|---|---|---|
| 2015/0053015 A1* | 2/2015 | Sarr | G01N 29/24 |
| | | | 73/632 |
| 2016/0123934 A1 | 5/2016 | Fetzer et al. | |
| 2017/0205378 A1* | 7/2017 | Sarr | G01N 29/225 |
| 2021/0181160 A1 | 6/2021 | Shehab | |

* cited by examiner

APPARATUS, SYSTEM, AND METHOD FOR ULTRASONIC INSPECTION OF A VARIABLE ANGLE JOINT

FIELD

This disclosure relates generally to ultrasonic inspection, and more particularly to ultrasonic inspection of variable angle joints.

BACKGROUND

Parts of vehicles, buildings, devices, and the like, may have structural abnormalities. Such abnormalities may be detected using non-destructive inspection techniques, such as those that use ultrasonic signals. Detection of abnormalities helps to ensure the quality of a part, improve manufacturing techniques, or assist in material selection. However, detecting abnormalities of variable radius joints using ultrasonic inspection techniques can be difficult. For instance, many inspection apparatuses used for inspecting variable radius joints change a focal length of an ultrasonic array either prematurely or too late after the radius of a joint has changed. Further, many inspection apparatuses require manual adjustment to maintain proper inspection distances in response to a change in a geometry of a part such as a joint radius or angle. Manual adjustment can impact time required to perform the inspection, introduce user error, and otherwise degrade inspection quality and efficiency.

SUMMARY

The subject matter of the present application has been developed in response to the present state of the art, and in particular, in response to the shortcomings of current ultrasonic inspection for variable radius joints, that have not yet been fully solved by currently available techniques. Accordingly, the subject matter of the present application has been developed to provide ultrasonic inspection of variable radius joints that overcomes at least some of the above-discussed shortcomings of prior art techniques.

The following is a non-exhaustive list of examples, which may or may not be claimed, of the subject matter, disclosed herein.

Disclosed herein is an apparatus for ultrasonic inspection. The apparatus comprises, in certain examples, a base, a lower coupler block slidably coupled to the base such that the base is translationally movable relative to the lower coupler block, and a pair of wings rotatably coupled to the lower coupler block at a wing pivot point and pivotable between a first angle and a second angle. In certain examples, the apparatus also includes a sensor carriage located within the base and slidably coupled to the base such that the sensor carriage is translationally movable relative to the base. The preceding subject matter of this paragraph characterizes example 1 of the present disclosure.

The apparatus, in certain examples, also includes an upper coupler block coupled to the lower coupler block, a pair of linkage arms that each have a first end pivotally coupled to one of the pair of wings, and a second end pivotally coupled to the upper coupler block. The preceding subject matter of this paragraph characterizes example 2 of the present disclosure, wherein example 2 also includes the subject matter according to example 1, above.

In certain examples, the apparatus also includes an upper coupler block coupled to a tool center point of a robotic arm system. The preceding subject matter of this paragraph characterizes example 3 of the present disclosure, wherein example 3 also includes the subject matter according to any one of examples 1 or 2, above.

The apparatus, in certain examples, includes an upper coupler block coupled to a handle. The preceding subject matter of this paragraph characterizes example 4 of the present disclosure, wherein example 4 also includes the subject matter according to any one of examples 1-3, above.

In certain examples, the apparatus includes an upper coupler block configured to cause the pair of wings to open in response to a force applied to the upper coupler block in a direction towards a part. The preceding subject matter of this paragraph characterizes example 5 of the present disclosure, wherein example 5 also includes the subject matter according to any one of examples 1-4, above.

Each of the pair of wings, in certain examples, includes a front side, a back side, a top side, and a bottom side. Each of the pair of wings also includes a slide rail disposed on an interior surface at a non-orthogonal angle with reference to the top side. The preceding subject matter of this paragraph characterizes example 6 of the present disclosure, wherein example 6 also includes the subject matter according to any one of examples 1-5, above.

In certain examples, each of the pair of wings includes a front side, a back side, a top side, and a bottom side. Each of the pair of wings also includes a slide rail disposed on an interior surface at a non-orthogonal angle with reference to the top side. The apparatus also includes a rod member having a first end and a second end, wherein the first end is slidingly coupled to a first wing slide rail of a first wing of the pair of wings, and the second end is slidingly coupled to a second wing slide rail of a second wing of the pair of wings. The preceding subject matter of this paragraph characterizes example 7 of the present disclosure, wherein example 7 also includes the subject matter according to any one of examples 1-6, above.

The lower coupler block, in certain examples, includes a pair of extension arms, each having a slot for receiving a rod member. The preceding subject matter of this paragraph characterizes example 8 of the present disclosure, wherein example 8 also includes the subject matter according to any one of examples 1-7, above.

In certain examples, the apparatus also includes an ultrasonic unit mounted to the sensor carriage such that the ultrasonic unit is non-movable relative to the sensor carriage. The preceding subject matter of this paragraph characterizes example 9 of the present disclosure, wherein example 9 also includes the subject matter according to any one of examples 1-8, above.

In certain examples, movement of the sensor carriage relative to the base adjusts a focal point of an ultrasonic unit relative to the base. The preceding subject matter of this paragraph characterizes example 10 of the present disclosure, wherein example 10 also includes the subject matter according to any one of examples 1-9, above.

The apparatus also includes, in certain examples, a part contact surface wherein the part contact surface is configured to be slidable along a part being inspected and the sensor carriage is configured to move translationally relative to the base in response to the base and the pair of wings being displaced while sliding in response to a changing web to flange angle of the part being inspected. The preceding subject matter of this paragraph characterizes example 11 of the present disclosure, wherein example 11 also includes the subject matter according to any one of examples 1-10, above.

In certain examples, the apparatus also includes a fluid port formed in the base and configured to facilitate fluid contact at an ultrasonic unit of the sensor carriage. The preceding subject matter of this paragraph characterizes example 12 of the present disclosure, wherein example 12 also includes the subject matter according to any one of examples 1-11, above.

Further disclosed herein is a system for ultrasonic inspection. The system includes an apparatus that comprises a base having a part contact surface, a lower coupler block slidably coupled to the base such that the base is translationally movable relative to the lower coupler block, and a pair of wings rotatably coupled to the lower coupler block at a wing pivot point and pivotable between a first angle and a second angle. The apparatus also includes a sensor carriage located within the base and slidably coupled to the base such that the sensor carriage is translationally movable relative to the base. In certain examples, the system also includes a tool configured to receive the apparatus and position the apparatus to provide an ultrasonic signal from an ultrasonic unit and detect a reflected ultrasonic signal at the ultrasonic unit, and a controller configured to process the reflected ultrasonic signal received by the ultrasonic unit to determine a presence of an abnormality corresponding to the positioning of the apparatus. The preceding subject matter of this paragraph characterizes example 13 of the present disclosure.

The tool, in certain examples, is configured to position the apparatus using a sliding motion. The preceding subject matter of this paragraph characterizes example 14 of the present disclosure, wherein example 14 also includes the subject matter according to example 13, above.

In certain examples, the tool is configured to position the apparatus using a sliding motion in a sliding direction, and the sensor carriage is translationally movable in a displacement direction which is non-parallel to the sliding direction. The preceding subject matter of this paragraph characterizes example 15 of the present disclosure, wherein example 15 also includes the subject matter according to any one of examples 13 or 14, above.

The tool, in certain examples, includes a robotic arm having a tool center point. The preceding subject matter of this paragraph characterizes example 16 of the present disclosure, wherein example 16 also includes the subject matter according to any one of examples 13-15, above.

Additionally disclosed herein is a method of ultrasonic testing. The method, in certain examples, includes positioning an apparatus on a part at a joint of the part between a web and a flange such that a first wing of the apparatus contacts the web and a second wing of the apparatus contacts the flange. The first wing, in certain examples, is pivotally coupled to the second wing at a wing pivot point of a lower coupler block of the apparatus. The method also includes emitting an ultrasonic signal from the apparatus to a focal point proximate the joint of the part, sliding the apparatus from the web to the flange through the joint, and actuating a linkage arm, in response to movement of a base relative to the first wing and the second wing, to move a sensor carriage of the apparatus relative to the base to adjust a position of a focal point of the ultrasonic signal based on a web to flange angle. The preceding subject matter of this paragraph characterizes example 17 of the present disclosure.

The method, in certain examples, includes pivoting the first wing and the second wing away from the base. The preceding subject matter of this paragraph characterizes example 18 of the present disclosure, wherein example 18 also includes the subject matter according to example 17, above.

In certain examples, the method also includes pressing a part contact surface of the base against a surface of the part. The preceding subject matter of this paragraph characterizes example 19 of the present disclosure, wherein example 19 also includes the subject matter according to any one of examples 17 or 18, above.

The method further includes testing the joint along a length of a part. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
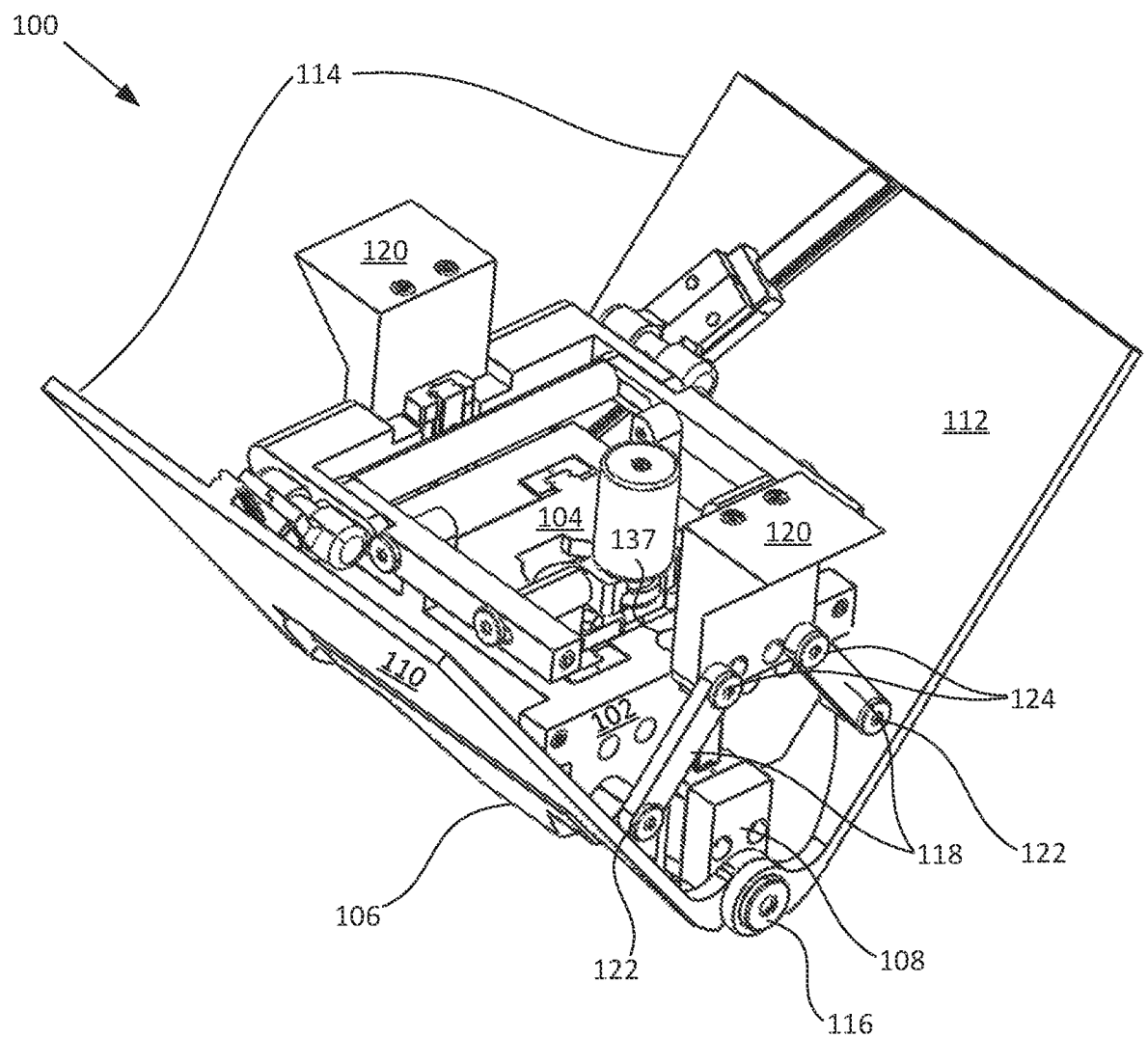
FIG. 1 is a perspective-view diagram of an apparatus for ultrasonic testing, according to examples of the subject disclosure.

FIG. 1 illustrates an apparatus 100 for ultrasonic inspection. The apparatus 100 includes a base 102 configured to house a sensor carriage 104. The base 102 includes a part contact surface 106. The part contact surface 106 is formed on a bottom of the base 102 and positioned to contact a part (see FIG. 2). The part contact surface 106, in certain examples, is configured to be slidable along a surface of the part 126. The base 102 includes one or more mounting locations, ports, or other features. As will be discussed in greater detail below with reference to FIGS. 2-15, the base 102 is slidingly coupled with a lower coupler block 108. The lower coupler block 108, in certain examples, includes a slot that engages with a track on the base 102 (see FIG. 4).

A first wing 110 and a second wing 112 (referred to collectively as a "pair of wings 114"), in certain examples, are each rotatably coupled to the lower coupler block 108 at a wing pivot point 116. The pair of wings 114 are configured to engage a surface of a part as the apparatus 100 is moved across the surface. When scanning a part with a joint between a web and flange, the pair of wings 114 transition between fully extended and fully retracted positions based on an angle between the web and the flange. This angle (see FIG. 2) causes the pair of wings 114 to adjust a position of an ultrasonic sensor with reference to the part via linkage arms 118. In certain examples, each of the pair of wings 114 are coupled with a linkage arm 118 to an upper coupler block 120. In some examples, the upper coupler block 120 is connected with a handle or a robotic arm.

The linkage arm 118, of each of the pair of wings 114, is pivotally connected at a first end 122 with either the first wing 110 or the second wing 112, and is pivotally connected at a second end 124 with the upper coupler block 120. The upper coupler block 120, in certain examples, is slidingly coupled with the base 102. An input force (i.e., downward pressure) applied to the upper coupler blocks 120 causes the pair of wings 114, via the linkage arms 118, to flatten or open until making contact with the surface of the part.

Although, in the illustrated example, the linkage arms 118 are depicted as a single member pivotally coupled at each end, more or fewer members can be used to facilitate movement of the wings and the upper coupler block 120. The linkage arms 118, in certain examples, include throughholes, blind-holes, posts, or the like to facilitate connection with at least one of the wings 110, 112 and the upper coupler block 120. In the illustrated example, each linkage arm 118 has a similar or identical geometry. While the geometry is shown as elongated, the linkage arm 118, in certain examples, has other shapes or form factors. As the upper coupler blocks 120 move in response to an input force, the pair of wings 114 move relative to the base 102. The movement of the pair of wings 114 relative to the base 102 actuates and moves the sensor carriage 104 relative to the base 102.

The base 102 is sized to receive the sensor carriage 104 of the apparatus 100. The sensor carriage 104 is movably coupled to the base 102 such that the sensor carriage 104 is translationally movable relative to the base 102. The sensor carriage 104, stated differently, is sized to nest into the base 102 and translate relative to the base 102 in a displacement direction (see FIG. 4).

Translational movement of the upper coupler blocks 120 relative to the base 102 causes the linkage arms 118 to pivot about the upper coupler blocks 120 which translates into a spreading or narrowing of the pair of wings 114. The "opening" or "closing" of the pair of wings 114 causes a translational movement of the wing pivot point 116 of the lower coupler block 108. The sensor carriage 104, in certain examples, is configured to move proportionally with the lower coupler block 108 relative to the base 102. For example, if the lower coupler block 108 moves 10 cm with reference to the base 102, the sensor carriage is configured to move 1 cm with reference to the base 102. This 10 to 1 ratio is given herein by way of example only, any reasonable ratio is achievable with modification of pivot point positions and linkage arm lengths, as will be described in greater detail below.

Figure 2:
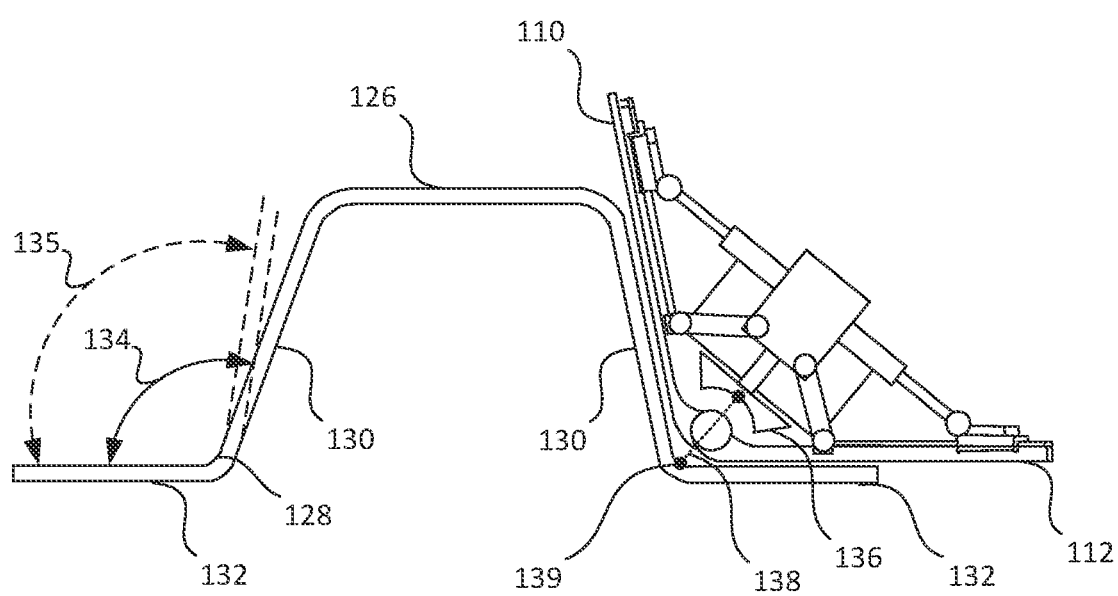
FIG. 2 is a side-view diagram of the apparatus relative to a part, according to examples of the subject disclosure.

Referring to FIG. 2, the apparatus 100 is shown relative to a part 126. The depicted example is a schematic diagram illustrating a simplified view of a cross-section of the part 126 and the apparatus 100. The part 126, in certain examples, is any suitable structure such as a portion of an aircraft (e.g., wing, fuselage, etc.) or another manufactured structure. In the depicted example, the part 126 is a structure that has a joint 128 formed by the intersection of a web 130 (i.e., a first part surface) and a flange 132 (i.e., a second part surface). An angle 134 is defined by the web 130 and the flange 132 and is variable according to a design of the part 126. In some areas of the part 126 the web to flange angle can be smaller or bigger. Beneficially, the apparatus 100 is operable to transition an angle formed by the pair of wings 114 between a first angle 134 and a second angle 135 (i.e., a changing web to flange angle) that is formed by the web 130 and the flange 132. Stated differently, the pair of wings 114 are pivotable to different angles between a maximum angle and a minimum angle.

Figure 4:
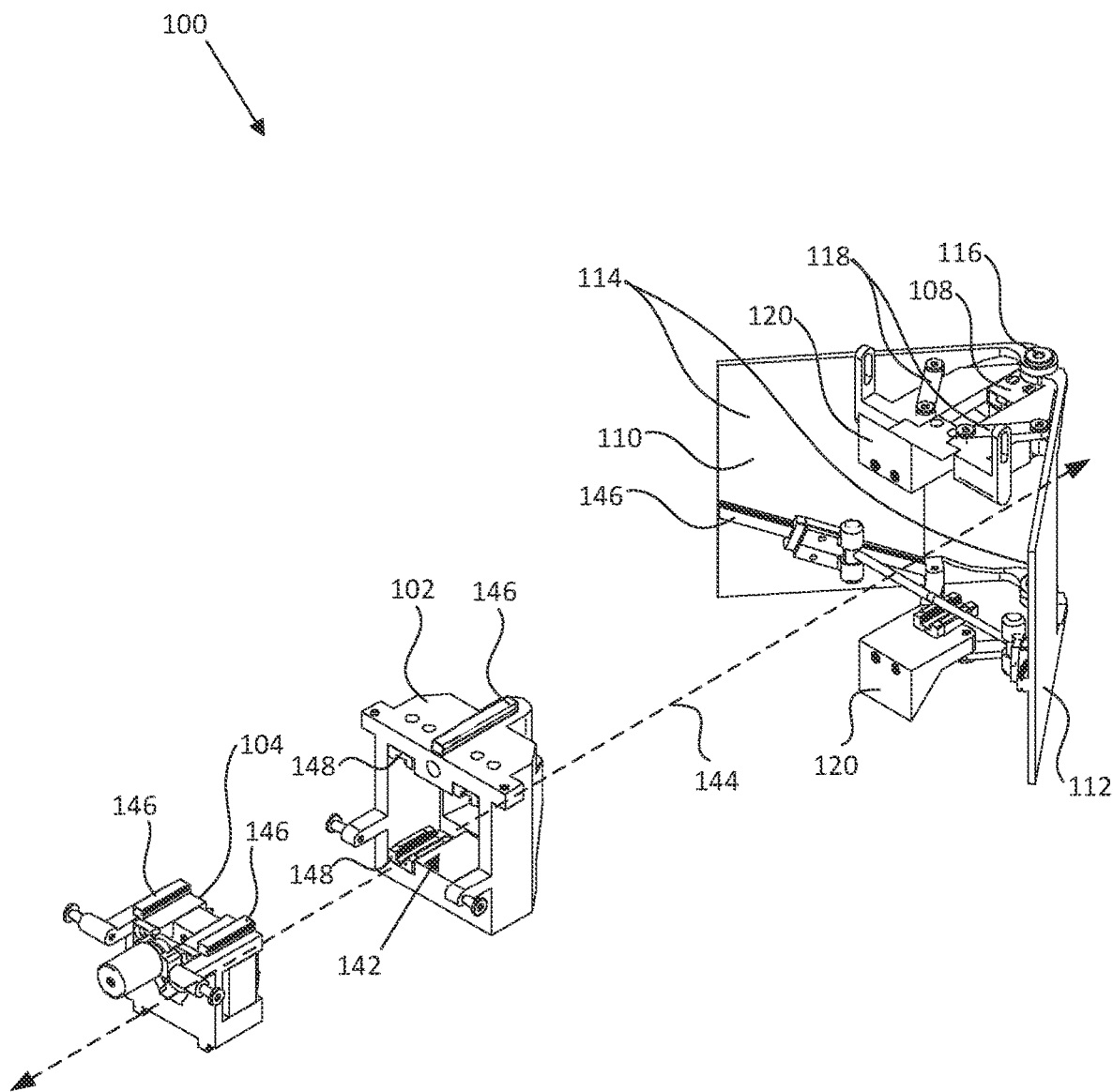
FIG. 4 is an exploded-view diagram of the apparatus, according to examples of the subject disclosure.

The apparatus 100, in certain examples, includes an ultrasonic unit 136 disposed within the sensor carriage 104 (see FIG. 4). The ultrasonic unit 136 is arc-shaped and houses one or more ultrasonic elements that are operable to generate and direct an ultrasonic beam towards the part. The arc shape of the ultrasonic unit 136, in certain examples, defines a circular-arc shape having a radius. The ultrasonic beam of each of the individual ultrasonic elements pass through a center of the circular arc. This is also referred to as a "focal point" of the ultrasonic unit 136. Other geometries of ultrasonic units 136 are contemplated that focus the ultrasonic beam at a particular focal distance 138 from the ultrasonic unit 136. In certain examples, the focal distance 138 is fixed and defined by the configuration of the ultrasonic unit 136. Beneficially, the apparatus 100 is configured to translationally move the ultrasonic unit 136 with reference to the base 102 in response to the angle 134.

Figure 3:
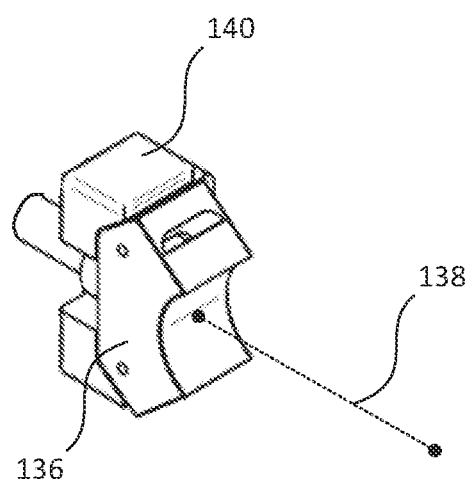
FIG. 3 is a perspective-view diagram of an ultrasonic unit, according to examples of the subject disclosure.

FIG. 3 is a perspective view diagram of an ultrasonic unit 136, according to examples of the subject disclosure. The ultrasonic unit 136, in certain examples, is mounted within the sensor carriage 104. In some examples, the ultrasonic unit 136 is coupled to an array holder 140 that is coupled to the sensor carriage 104. In one example, the ultrasonic unit 136 is disposed at least partially within a cavity formed in the sensor carriage 104 (see FIG. 7a). The ultrasonic unit 136 is non-movable relative to the sensor carriage 104. In other words, the ultrasonic unit 136 is fixedly coupled to the sensor carriage 104 such that the ultrasonic unit 136 moves as the sensor carriage 104 moves. Although the ultrasonic unit 136 utilizes ultrasonic signals for inspection, in other examples, the ultrasonic unit 136 can be replaced with a unit that utilizes other types of signals for inspection, such as optical, x-ray, electron, or other imaging or inspection signals.

Movement of the sensor carriage 104 with the ultrasonic unit 136 coupled thereto allows for a focal distance 138 of the ultrasonic unit 136 to be adjusted or move relative to the base 102. Adjustment of the focal point 139 provides a consistent alignment for continuous inspection. This allows for automatic response and adjustment of the apparatus 100 to changes in a geometry of the part 126 at the joint 128 or other region to be inspected.

In some examples, the ultrasonic unit 136 is positioned in the sensor carriage 104 to be centrally located on the apparatus 100. In certain other examples, other positions and alignments of the ultrasonic unit 136 are used. The ultrasonic unit 136 includes an array of ultrasonic elements, in certain examples. In some examples, the ultrasonic unit 136 includes a single ultrasonic element. The ultrasonic unit 136 both emits and detects ultrasonic energy in certain examples. In some examples, the ultrasonic unit 136 has one or more dedicated emitters and dedicated detectors. Information corresponding to the reflected ultrasonic signal or beam, collected by the detectors, is communicated with a controller (see FIG. 12).

Referring back to FIG. 1, the apparatus 100 includes one or more fluid ports 137. The fluid ports facilitate the introduction of fluid and fluid contact at the ultrasonic unit 136. For example, the fluid ports are coupled to a fluid supply. Fluid from the fluid supply and provided to the fluid ports is discharged at an interface between the ultrasonic unit 136 and the part 126 being inspected to provide an improved ultrasonic coupling with the part 126 at the ultrasonic unit 136. Accordingly, fluid provided by the fluid ports helps facilitate improved resolution, reduced artifacts, or otherwise improved imaging by the ultrasonic unit 136.

Turning now to FIG. 4, depicted is an exploded-view diagram of the apparatus 100, according to examples of the subject disclosure. The apparatus 100, as mentioned above, includes the base 102, the sensor carriage 104, and a pair of wings 114. The base 102, in certain examples, has a base cavity 142 dimensioned to receive the sensor carriage 104 and the ultrasonic unit 136 coupled to the sensor carriage 104. The sensor carriage 104 is configured to slidably couple to the base 102 so that the sensor carriage 104 is movable along a displacement direction 144 relative to the base 102. As depicted here, the displacement direction 144 is towards or away from the part 126 along an axis defined.

In certain examples, one or more t-tracks 146 coupled to the sensor carriage 104 engage one or more respective slots 148 of the base 102. The slots 148 are disposed within the base cavity 142 and allows for the sensor carriage 104 to slide and move along the displacement direction 144 with reference to the base 102. Accordingly, the sensor carriage 104 is configured to adjust the focal distance 138 of the ultrasonic unit 136. The base 102, similarly, includes one or more t-tracks 146 that slidably engage slots 148 of the upper coupler block 120 and the lower coupler block 108 so that the base 102 is movable along the displacement direction 144 relative to the lower coupler block 108.

In certain examples, the first wing 110 and the second wing 112 are coupled by a rod member 150. The rod member 150 includes a first end 152 that is slidingly coupled to the first wing 110, and a second end 154 that is slidingly coupled to the second wing 112. One example of a sliding coupling includes, but is not limited to a t-track 146 and a slot member 156. The slot member 156, in certain examples, is pivotally coupled to the first end 152 or the second end 154 to allow for the angle of the first wing 110 or the second wing 112 to change with respect to the rod member 150 as the pair of wings 114 transition between open or extended positions and closed positions, or any point in between.

Figure 6:
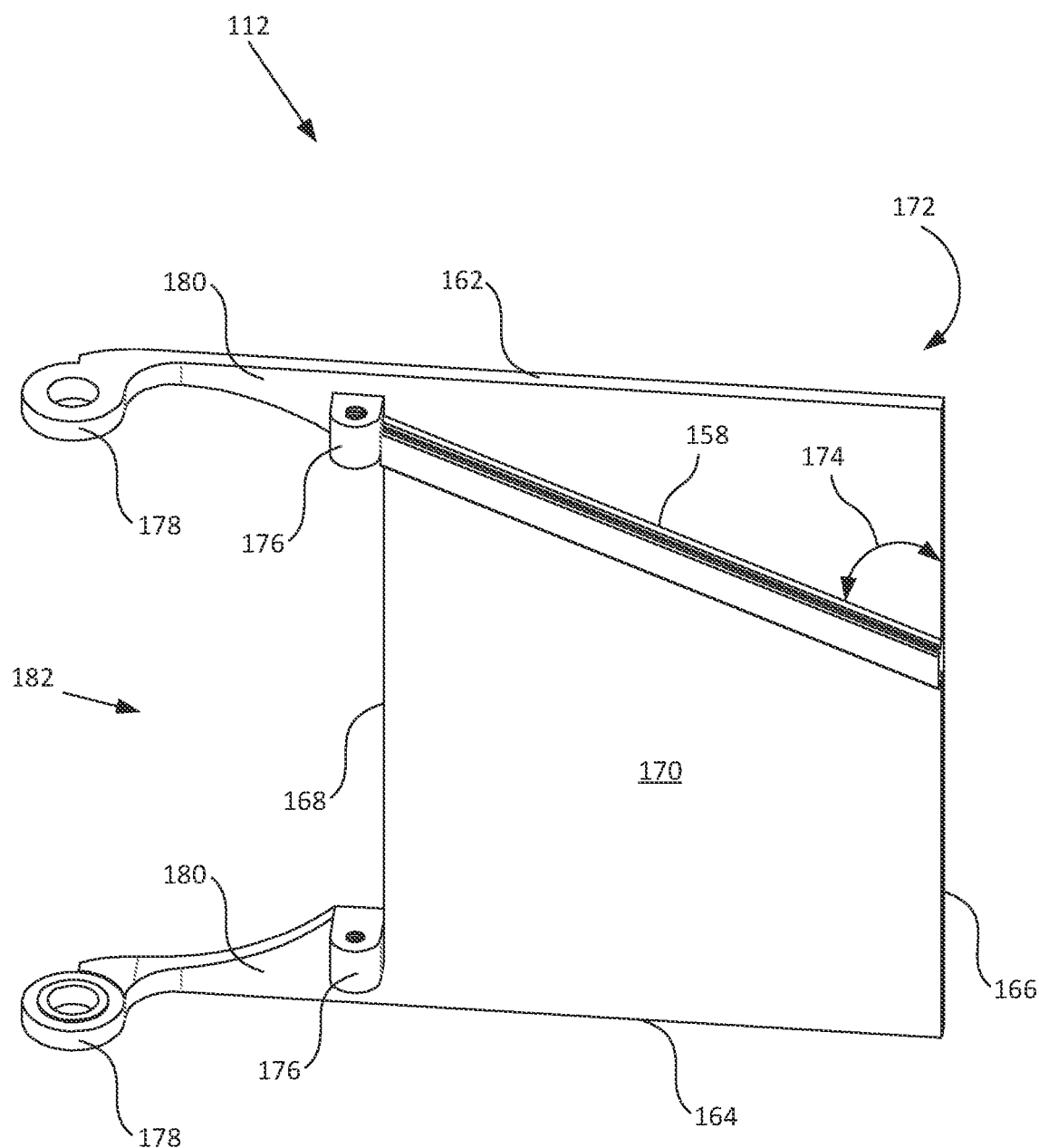
FIG. 6 is a perspective-view diagram of a wing, according to examples of the subject disclosure.
Figure 7A:
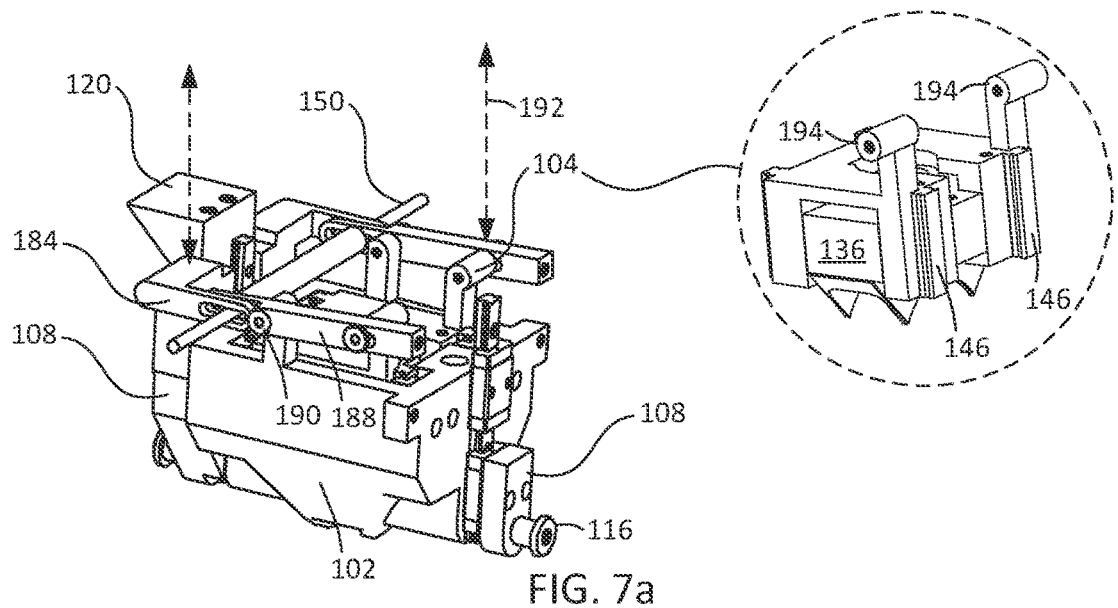
FIG. 7a is a perspective-view diagram of a base, according to examples of the subject disclosure.
Figure 7B:
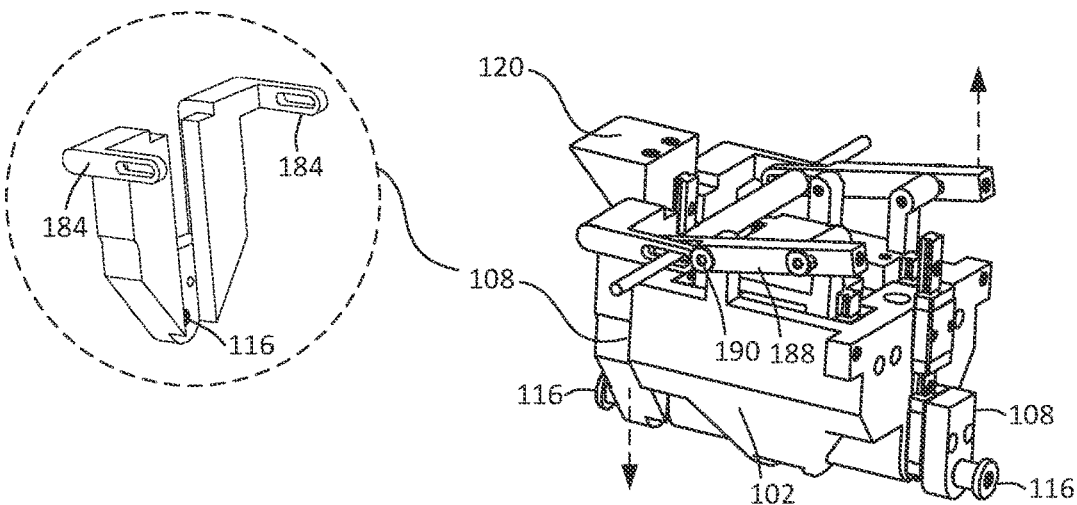
FIG. 7b is a perspective-view diagram of the base, according to examples of the subject disclosure.

The rod member 150, in certain examples, has a fixed length and does not move translationally along the displacement direction 144 with reference to the lower coupler block 108 as the pair of wings 114 opens and closes (see FIG. 7b for a depiction of the lower coupler block 108 with a rod member slot). The t-track, or wing slide rail 158, of either the first wing 110 or the second wing 112, is disposed at a non-orthogonal angle with reference to a top side of the wing (see FIG. 6). The rod member 150 moves laterally with reference to an axis defined by the displacement direction 144. In the depicted example, lateral movement of the rod member 150 is in a direction perpendicular with reference to the displacement direction 144.

Figure 5:
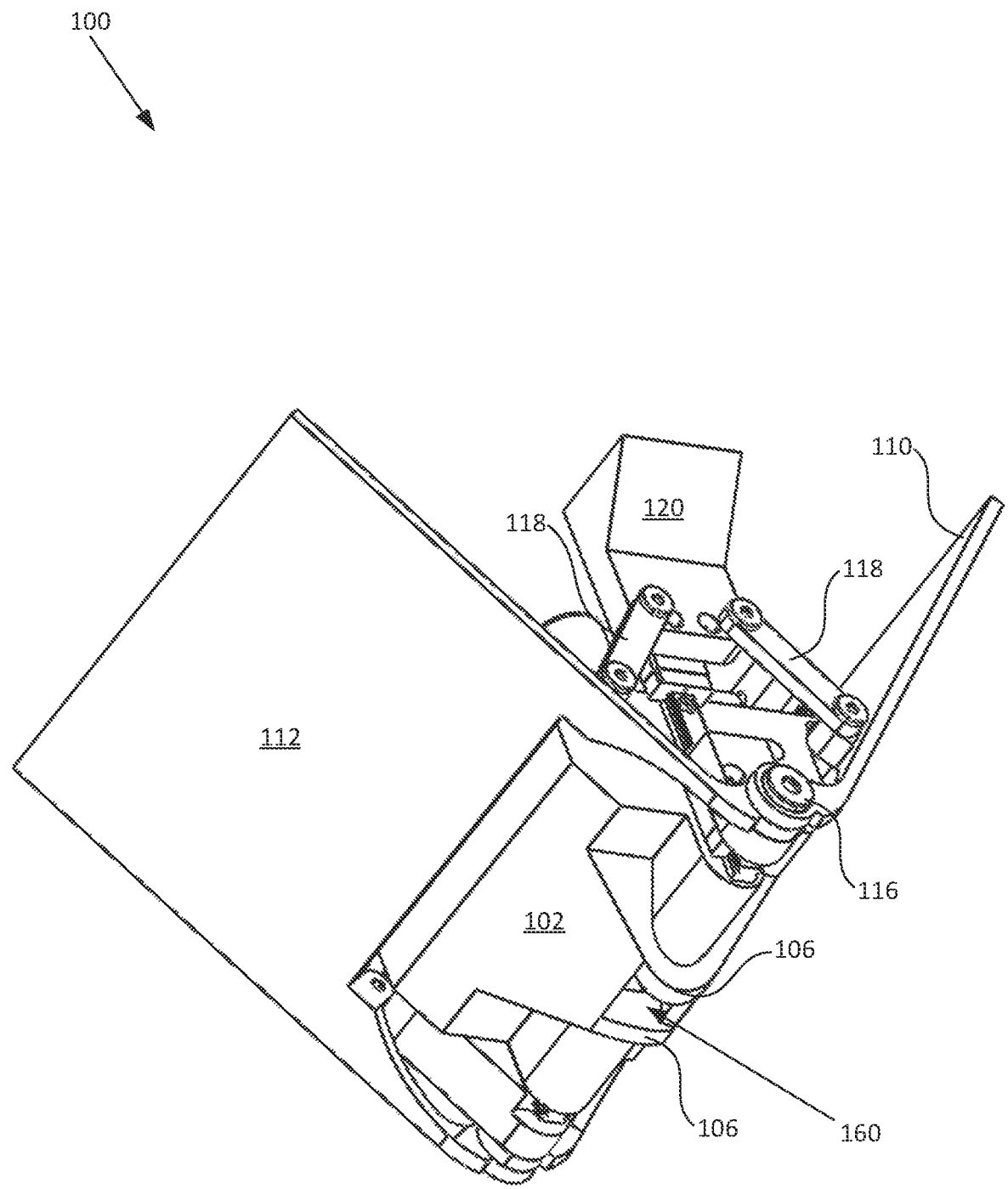
FIG. 5 is a perspective-view diagram of a part contact surface, according to examples of the subject disclosure.

FIG. 5 is a perspective view diagram illustrating the part contact surface 106, according to examples of the subject disclosure. The part contact surface 106 is disposed on either side of an inspection aperture 160. The inspection aperture 160 is formed in the base 102 and allows for passage of ultrasonic or other inspection energy between the ultrasonic unit 136 and the part 126 for inspection. The inspection aperture 160, in certain examples, is centrally located in the part contact surface 106. The part contact surface 106, in some examples, is curved with a radius that is substantially equal to or smaller than a radius of the joint 128 that is being inspected. If the part 126 has a varying radius, the curve of the part contact surface 106, in certain examples, is smaller than the smallest radius. In some examples, the part contact surface 106 includes other shape features, surface treatments, and/or coatings. In certain examples, the part contact surface 106 includes grooves or passages to allow for ultrasonic fluid to pass. Other depicted features of the part contact surface 106 facilitate movement of the apparatus 100 along a surface of a part 126.

A downward force applied (i.e., a force applied towards the part 126) to the upper coupler block 120 is transferred through the linkage arms 118 to the first wing 110 and the second wing 112 if the part contact surface 106 is engaging the part 126. This causes the pair of wings 114 to open and make contact with the part 126. As the pair of wings 114 open, the rod member 150 (see FIGS. 7a-7c) which moves with the lower coupler block 108, causes the wing pivot point 116 to move away from the part 126 and also proportionally moves the ultrasonic unit 136 in the same direction. If a cross-sectional profile of the part 126 changes (i.e., the web to flange angle changes) and displaces, or causes the angle of the pair of wings 114 to change, the sensor carriage 104 is moved translationally with respect to the base 102.

Referring now to FIG. 6, depicted is a perspective view diagram of the second wing 112, according to examples of the subject disclosure. It should be noted that, in certain examples, the first wing 110 is reflectively symmetric of the second wing 112. As such, the discussion here with reference to FIG. 6 applies equally to the first wing 110. In certain examples, the second wing 112 includes a front side 162, a back side 164, a top side 166, and a bottom side 168. The second wing 112 is substantially planar having an interior surface 170 and an exterior surface 172 (see also FIG. 1). The exterior surface 172 of the second wing, in certain examples, is configured to engage a surface of the part 126 such as the web 130 or the flange 132.

In certain examples, the second wing 112 includes the slide rail 158 that is coupled to the interior surface 170 of the second wing 112. The slide rail 158, in some examples, is disposed at an angle 174 with respect to the top side 166. In certain examples, the angle 174 is non orthogonal with respect to the top side 166. Beneficially, the angle 174 of the slide rail 158 causes the rod member 150 to "climb" towards the top side 166 and raise the lower coupler block 108 with respect to the top side 166 while the base 102 remains pressed against the part 126. This also causes a proportional movement of the sensor carriage 104 with respect to the base 102 that adjusts the focal distance 138.

In certain examples, the second wing 112 includes pivot points 176 for coupling with the linkage arms 118, and pivot points 178 for coupling with the lower coupler block 108. The pivot points 178, in some examples, are disposed at distal ends of wing arms 180 that extend outward from the bottom side 168. An opening 182 is formed by the wing arms 180 of the pair of wings 114 through which the base 102 passes.

FIG. 7a is a perspective view diagram illustrating the base 102, according to examples of the subject disclosure. In particular, FIG. 7a depicts the sensor carriage 104 in a neutral position with respect to the base 102. The lower coupler block 108, in certain examples, is configured with a pair of extension arms 184 that extend upward and inward towards the sensor carriage 104. The extension arms 184, in some examples, each contain a slot 186 for receiving the rod member 150. The rod member 150 also passes through a lever member 188 to movably couple the extension arm 184 with the lever member 188. Stated differently, translational movement towards or away from the part 126 of the lower coupler block 108 causes the sensor carriage 104 to move in the opposite direction because the lever member 188 rotates about a lever pivot point 190. Accordingly, a first end of the lever member that moves downward with respect to the base 102 causes the second end of the lever member 188 to rotate upward with respect to the base 102 which causes the sensor carriage 104 to also move upward with respect to the base 102, and thereby increase the focal distance 138 of the ultrasonic unit 136.

Also depicted, in the callout, is a perspective view of the sensor carriage 104 with the ultrasonic unit 136. In certain examples, the sensor carriage 104 is coupled to one or more t-tracks 146 that are configured to engage t-slots 148 in the base 102 (see FIG. 4). The t-track 146 allows for the sensor carriage 104 to move upward and downward, as depicted by arrow 192, with reference to the base 102. The lever member 188 is pivotally coupled to the sensor carriage 104 at a sensor carriage pivot point 194. The length of the lever member 188, together with the positioning of the lever pivot point 190 defines an amount of travel of the sensor carriage 104 with respect to the base 102. The amount of travel, in certain examples is proportional to an amount of travel of the lower coupler block 108 with respect to the base 102. For example, in one implementation, if the lower coupler block 108 moves 10 cm with respect to the base, sensor carriage 104 is configured to move approximately 1 cm. As such, the movement of the ultrasonic unit 136 is tunable based on the dimensions of the lever member 188 and the positioning of the lever pivot point 190 with respect to the lower coupler block 108.

FIG. 7b is a perspective view diagram illustrating the base 102, according to examples of the subject disclosure. In particular, the depicted example illustrates the sensor carriage 104 in a raised position with reference to the base 102. If the lower coupler block 108 is moved downward with respect to the base 102 (as a result of wing position, for example), the rod member 150 also moves downward causing the lever member 188 to pivot about the lever pivot point 190 and raise the sensor carriage 104. The result of this movement is an increase in in the distance between the ultrasonic unit 136 and the part contact surface 106.

The lower coupler block 108, in certain examples, includes the wing pivot point 116. The wing pivot point 116 is, in some examples, a fastener having a collar about which the pair of wings 114 pivots. The lower coupler block 108, in certain examples, includes the extension arms 184 that extend upward and outward from the wing pivot point 116. In some examples, the apparatus includes one lower coupler block 108 that includes the extension arms 184 and one lower coupler block 108 that does not include extension arms 184.

Figure 7C:
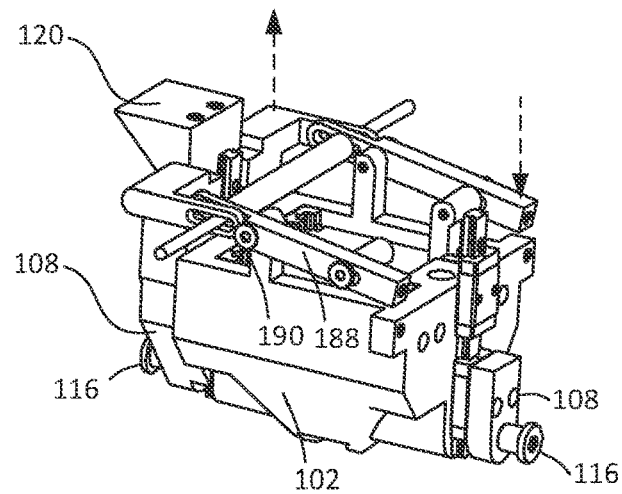
FIG. 7c is a perspective-view diagram of the base, according to examples of the subject disclosure.

Turning now to FIG. 7c, illustrated here is an example where the lower coupler block 108 moves upward with reference to the base 102 causing the lever member 188 to pivot and force the sensor carriage 104 downward with reference to the base 102. In certain examples, the lower coupler block 108 includes a slot formed between the extension arms 184 configured to slidingly engage the upper coupler block 120.

Figure 8:
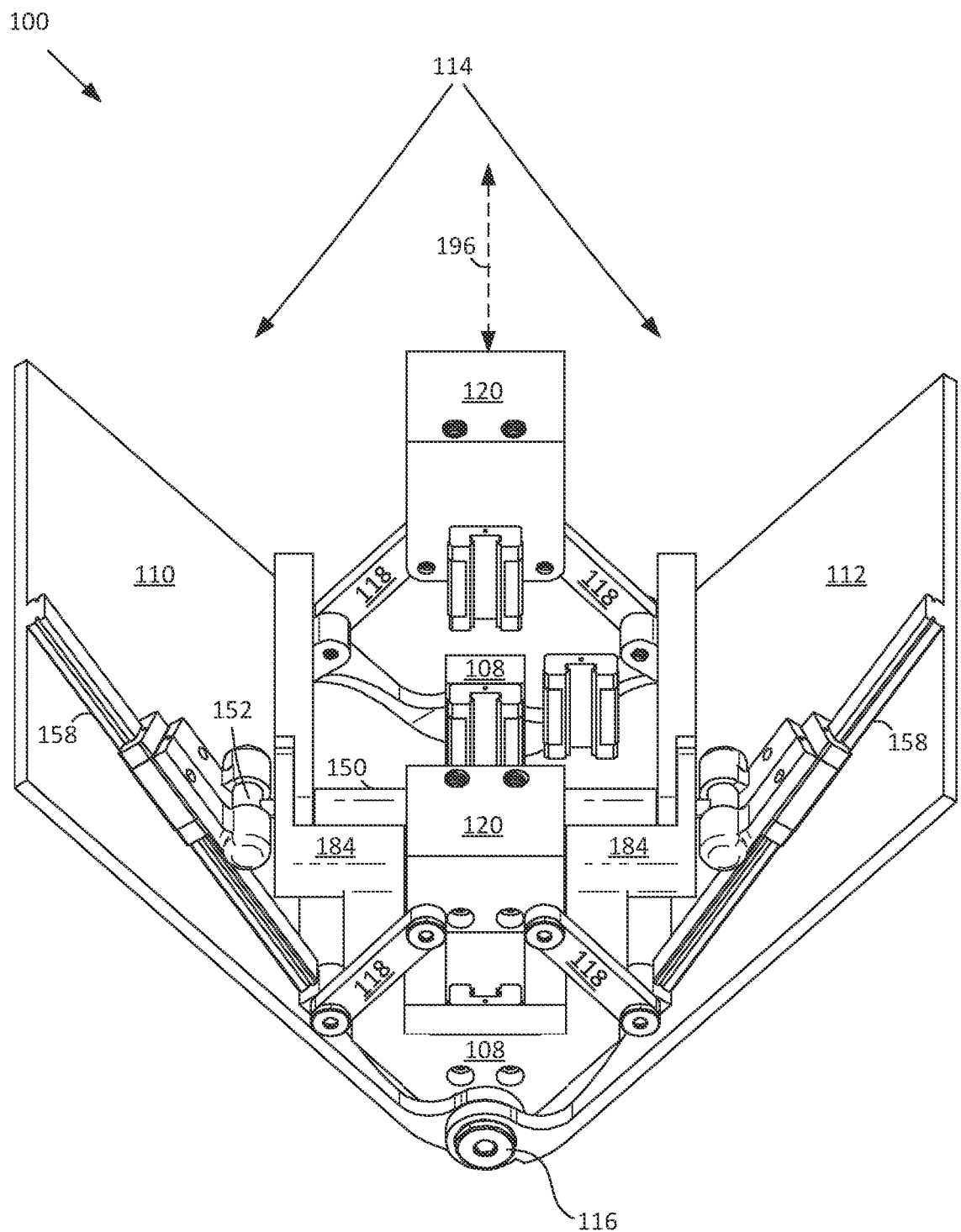
FIG. 8 is a perspective-view diagram of the apparatus, according to examples of the subject disclosure.

FIG. 8 is a perspective view diagram illustrating various components of the apparatus 100, according to examples of the subject disclosure. In the depicted example, the base 102 and the sensor carriage 104 are removed so as to illustrate the area formed between the pair of wings 114. As mentioned above, the upper coupler block 120 is coupled to the linkage arms 118. In certain examples, the upper coupler block 120 is configured to slidingly couple with a slot formed between the extension arms 184 of the lower coupler block 108 and cause the pair of wings 114 to open. Movement upward or downward, as depicted by arrow 196, of the upper coupler block 120 is translated into a closing or opening, respectively, of the pair of wings 114.

Figure 9:
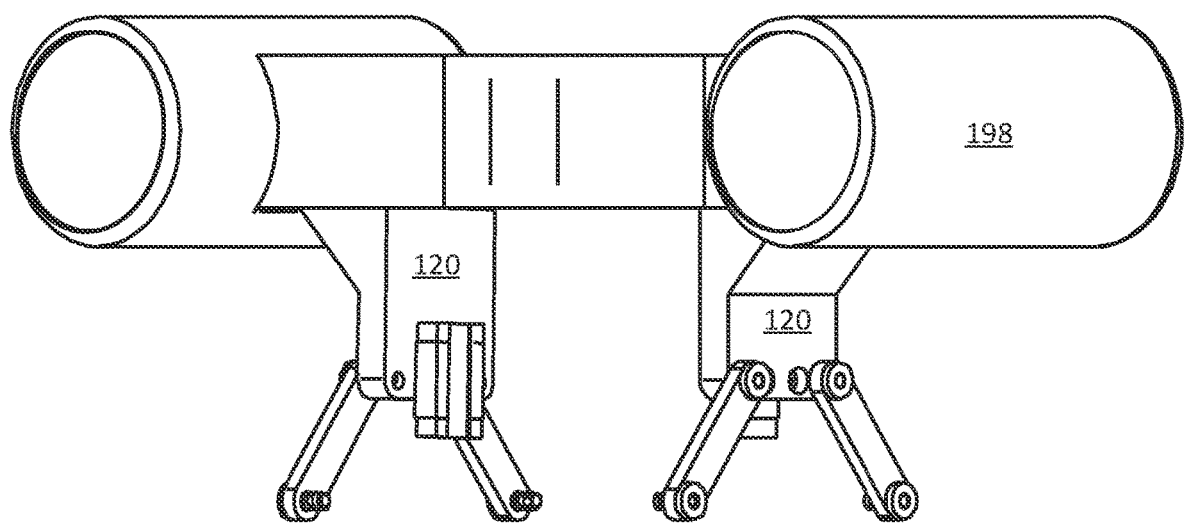
FIG. 9 is a perspective-view diagram of a handle, according to examples of the subject disclosure.

FIG. 9 is a perspective view diagram illustrating a handle 198, according to examples of the subject disclosure. The handle 198, in certain examples, is coupled to the upper coupler blocks 120 of the apparatus 100. The handle 198 allows for handheld use of the apparatus 100. A user, in some examples, positions the apparatus 100 on a surface of the part 126 and slides the apparatus 100 across the part 126, applying a force to the handle 198 such that the apparatus 100 maintains contact with the part of the surface. Although in some of the examples described above, upward, and downward forces are described with reference to the depicted examples, it is to be understood that the direction of the force can be in any reasonable direction that is necessary. For example, if the user is standing under a part 126, then the orientation of the apparatus will be flipped with reference to some of the depicted examples, and a described "downward" force is actually "upward." In general, the user applies a force on the handle 198 that is towards and normal to the surface of the part 126.

Turning now to FIGS. 10a-11b, each of these simplified schematic diagrams depict one of four extreme situations of the apparatus 100. During operation of the apparatus 100 on a part 126 with a varying web to flange angle and a varying radius, the apparatus 100 will constantly adjust the position of the ultrasonic unit based on a position of the pair of wings, the lower coupler block 108, and the upper coupler block 120, with reference to the base 102. Although any combination of these positions is possible, the extreme variants are depicted here.

Figure 10A:
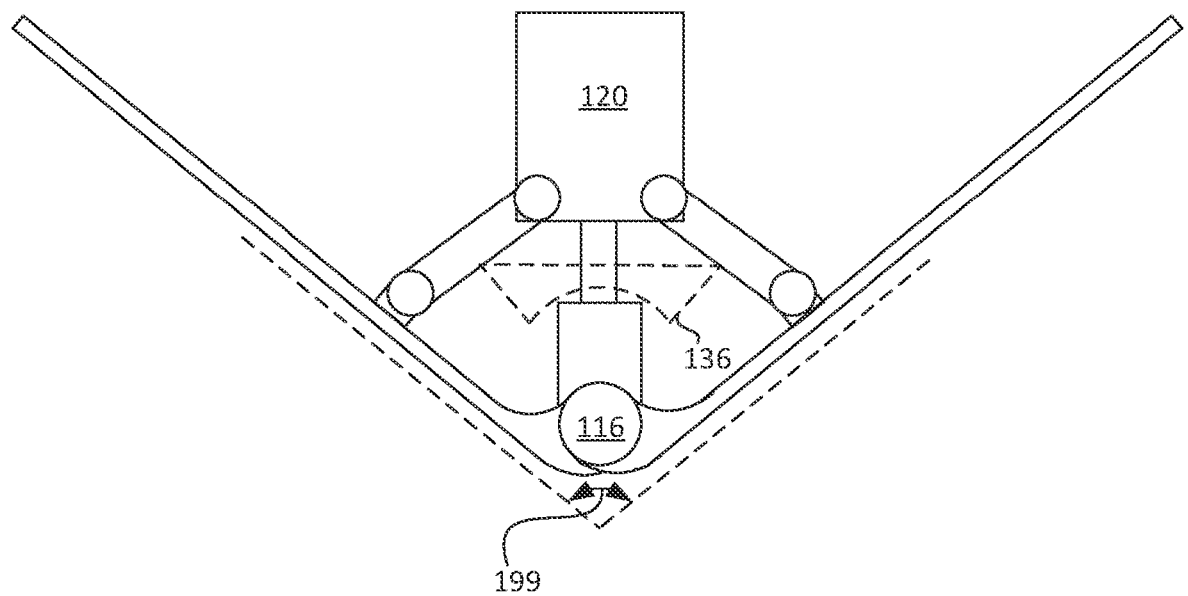
FIG. 10a is a schematic block diagram of the apparatus in a large angle and large radius position, according to examples of the subject disclosure.
Figure 10B:
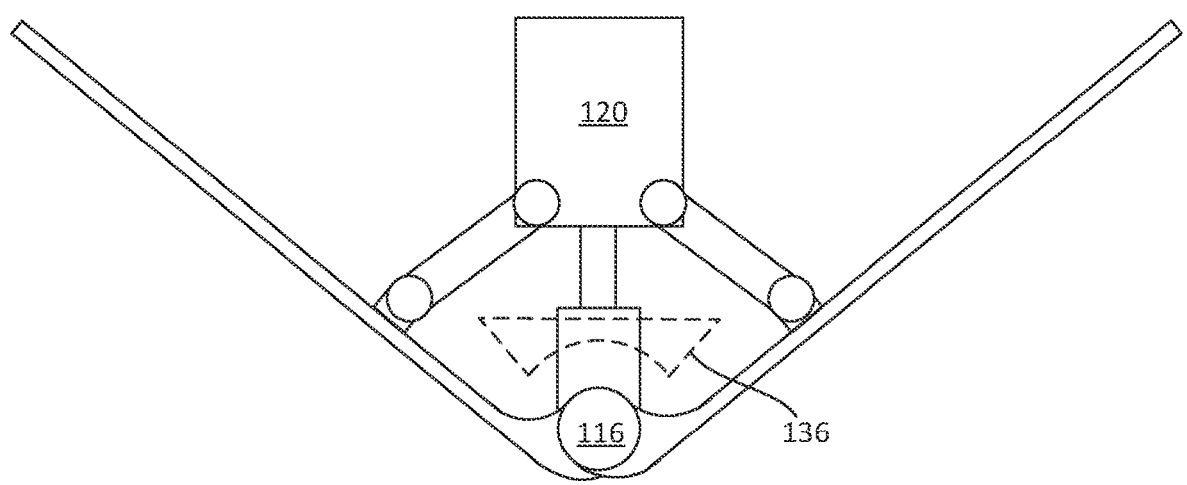
FIG. 10b is a schematic block diagram of the apparatus in a large angle and small radius position, according to examples of the subject disclosure.

FIG. 10a depicts the apparatus 100 in a large angle 199 and large radius section of the part 126. In this situation, the wings are spread apart and the ultrasonic unit 136 is positioned as far from the wing pivot point 116 as possible. FIG. 10b, conversely, depicts the apparatus when interacting with a large angle 199 and small radius section of the part 126. In this situation the wings are still spread apart but the ultrasonic unit 136 is positioned as close to the wing pivot point 116 as possible. Although not depicted, the ultrasonic unit 136 is positionable to any position between the maximum focal distance (FIG. 10a) and the minimum focal distance (FIG. 10b).

Figure 11A:
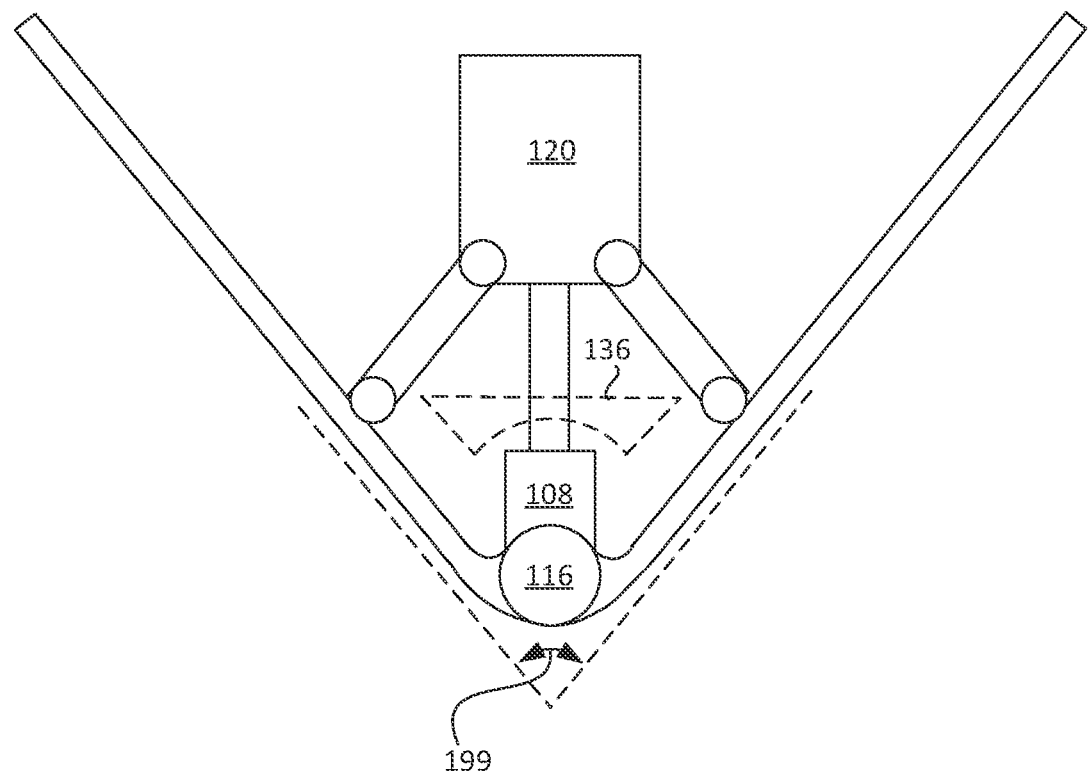
FIG. 11a is a schematic block diagram of the apparatus in a small angle and large radius position, according to examples of the subject disclosure.
Figure 11B:
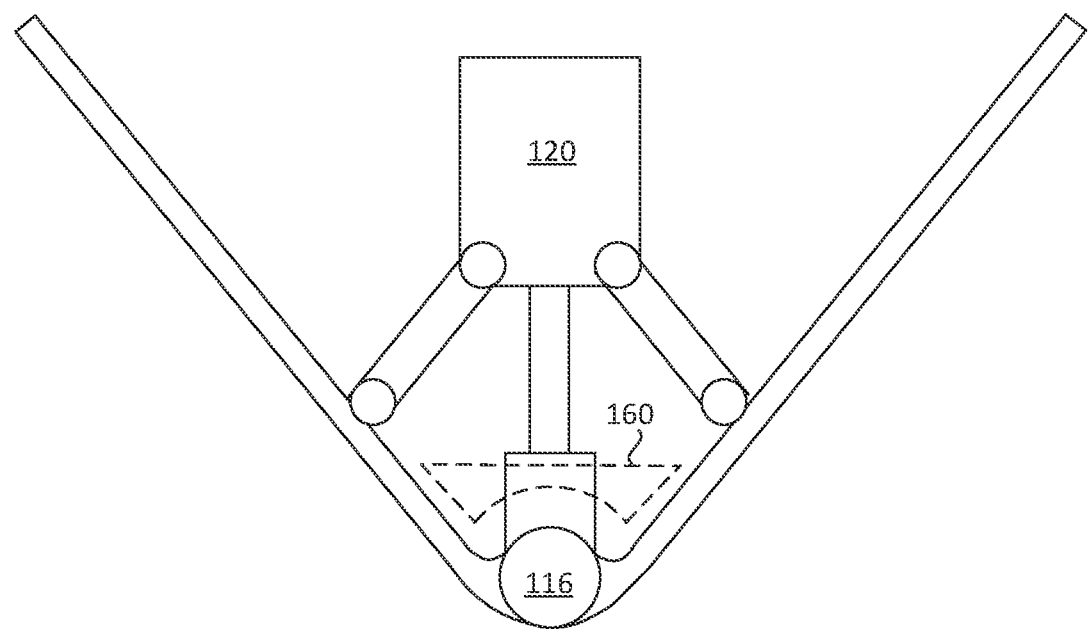
FIG. 11b is a schematic block diagram of the apparatus in a small angle and small radius position, according to examples of the subject disclosure.

FIG. 11a depicts the apparatus 100 in a small angle 199 and large radius section of the part 126. In this situation, the wings are closer and the ultrasonic unit 136 is positioned as far from the wing pivot point 116 as possible. FIG. 10b, conversely, depicts the apparatus when interacting with a small angle 199 and small radius section of the part 126. In this situation the wings are still closer but the ultrasonic unit 136 is positioned as close to the wing pivot point 116 as possible. Although not depicted, the wings are positionable to any position between the maximum (FIGS. 10a and 10b) and the minimum (FIGS. 11a and 11b).

Figure 12:
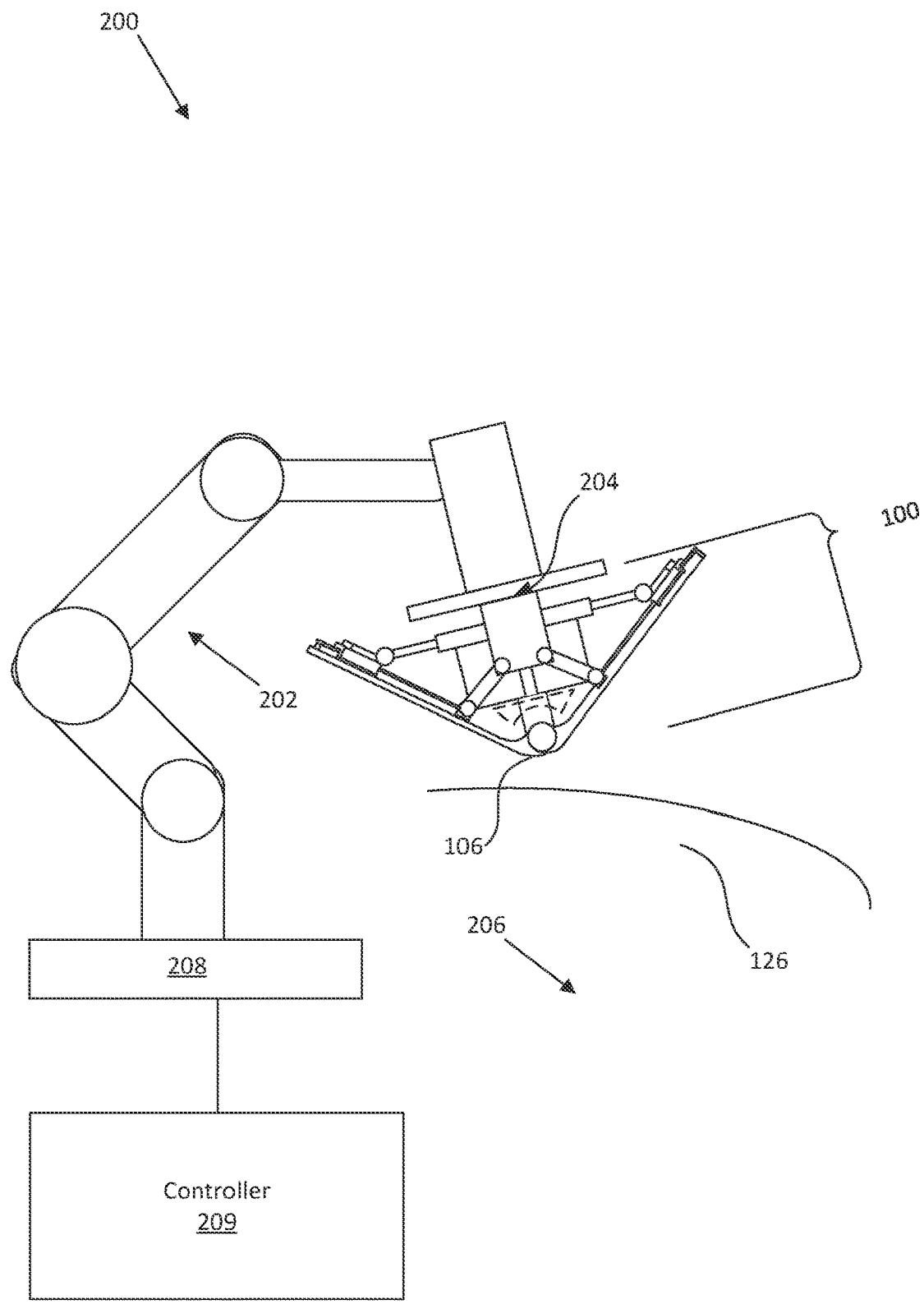
FIG. 12 is a schematic block diagram of a system for ultrasonic testing, according to examples of the subject disclosure.

Referring now to FIG. 12, shown is a schematic block diagram illustrating one example of a robotic arm system 200 for non-destructive inspection (NDI) of a manufacturing component (e.g., also referred to as the part 126), according to examples of the subject disclosure. In certain examples, the system 200 is used to inspect a variety of structures including composite structures of a wide range of sizes and shapes, such as composite aircraft wings, spars, and fuselage barrels.

The system 200, in certain examples, includes a robotic arm 202. The robotic arm 202 is a jointed-arm robot that is configured to provide movement and positioning of a tool center point (TCP) 204. The TCP 204, in certain examples, is a mathematical point (positioned on an end of the robotic arm 202) that the robotic arm 202 moves through space with reference to the robotic base 208. The TCP 204, in certain examples, is located at an end of the robotic arm 202, and is configured to couple to a tool, such as the apparatus 100. For example, the end of the robotic arm 202 is a plate to which the apparatus 100, or the end effector, is attached. The TCP 204, in certain examples, is a point positioned a predetermined distance from the end of the robotic arm that corresponds with an ideal distance from the apparatus 100 for scanning the surface of the part 126. In certain examples, the point is identified and positioned relative to a base 208 of the robotic arm 202. The controller 209 is configured to control movement and positioning of the TCP 204, and subsequently is configured to position the apparatus 100 using a sliding motion. The robotic arm 202, in certain examples, is configured to receive the apparatus 100.

The controller 209, in certain examples, is implemented using software, hardware, firmware, or a combination thereof. When software is used, the operations performed by the controller 209 are implemented using, for example, program code configured to run on a processor unit. When firmware is used, the operations are implemented using, for example, program code and data stored in persistent memory to run on a processor unit. When hardware is used, the hardware includes one or more circuits that operate to perform the operation of moving the TCP 204. The hardware, in certain examples, takes the form of a circuit system, an integrated circuit, an application specific integrated circuit (ASIC), a programmable logic device, etc.

The controller 209, in certain examples, is configured to control the movement of the robotic arm 202 which is capable of movement with up to six degrees of freedom or more. The robotic arm 202 is, in certain examples, is configured to couple with the end effector (e.g., the apparatus 100). The end effector, in one example, is integrated as part of the robotic arm 202 or alternatively, is removably coupled to the TCP 204. Inspection of the part 126, in certain examples, uses the apparatus 100, as described above with reference to FIGS. 1-11b. The structure of the part 126 is scanned by the apparatus 100 to ensure the part 126 is free of defects.

The part 126, in certain examples, has portions with curvatures of varying radii and varying angles. For effective scanning, the apparatus 100 is positioned adjacent the part 126 and moved in a sliding direction 206 which is non-parallel to a displacement direction (see FIG. 2). In certain examples, the apparatus 100 is maintained at a particular distance and angle or orientation relative to a particular position of the part 126. To accomplish this, the controller 209 is configured to communicate with a surface profiler. In certain examples, the surface profiler is a laser profiler configured to determine a contour or curvature of the surface of the part 126. In some examples, the surface profiler is configured to analyze and determine the contour information of the part 126 from a computer-aided design model of the part 126. The surface profiler, in certain examples, communicates the contour information with the controller 209. Subsequent to determining the curvature, the controller 209 is configured to maintain an appropriate distance between the apparatus 100 and the surface of the part 126.

In certain examples, the controller 209 is configured to receive information related to detection of the reflected ultrasonic energy emitted by the ultrasonic unit 136. The information, when analyzed, is useful for determining a presence of an abnormality. Stated differently, the controller 209 is configured to determine if the part 126 is damaged, has an abnormality, or is compromised.

Figure 13:
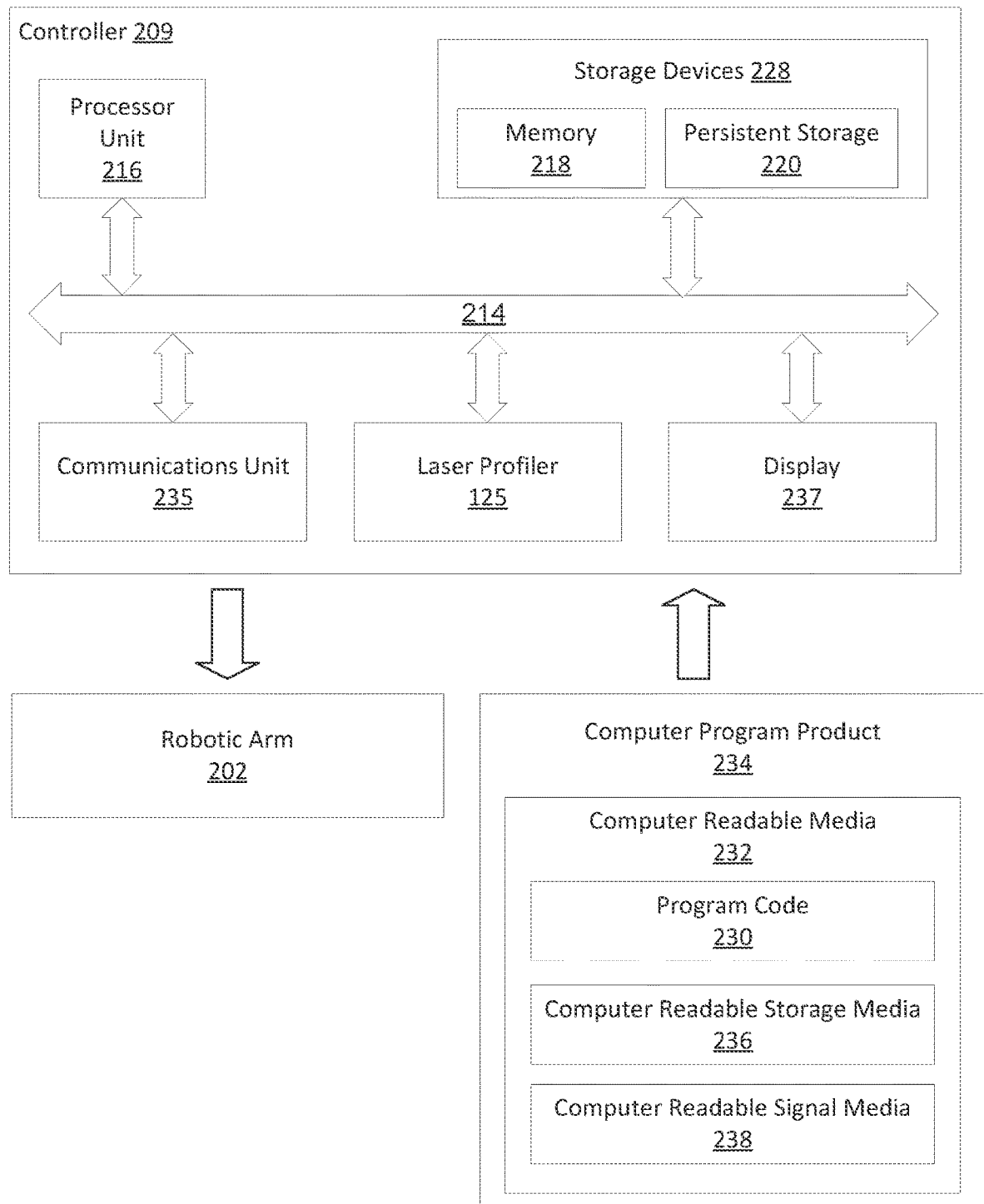
FIG. 13 is a schematic block diagram of a controller, according to examples of the subject disclosure.

FIG. 13 is a schematic block diagram illustrating a controller 209, according to examples of the subject disclosure. The controller 209 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, persistent storage 220, a communications unit 235, and a display 237.

The surface profiler, in certain examples, is disposed on the robotic arm 202 and is configured to scan the surface of the part 126 to determine a curvature of the surface of the part 126. The surface profiler is also configured to measure a distance between the TCP 204 and the part 126 and communicate that distance with the controller 209. In turn, the controller 209 is configured to move the TCP 204 in response to the determined distance.

The processor unit 216 serves to execute instructions for software that are loaded into memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communication unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 209 for execution by the processor unit 216. In some examples, the program code also contains the computer-aided design of the part 126. The program code 230 and computer readable media 236 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 209. In some instances, the computer readable storage media 236 is not removable from the controller 209.

Alternatively, the program code 230 is transferred to the controller 209 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 209. In one instance, program code stored in a computer readable storage media in a server data processing system is downloaded over a network from a server to the controller 209. According to various examples, the system providing the program code 230 is a server computer, a client computer, or some other device capable of storing and transmitting program code 230.

The different components illustrated for the controller 209 are not meant to provide physical or architectural limitations to the manner in which different examples can be implemented. The different illustrative examples can be implemented in a controller including components in addition to and/or in place of those illustrated for the controller 209. Other components shown in FIG. 13 can be varied from the illustrative examples shown. The different examples can be implemented using any hardware device or system capable of executing program code. For example, a storage device in the controller 209 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
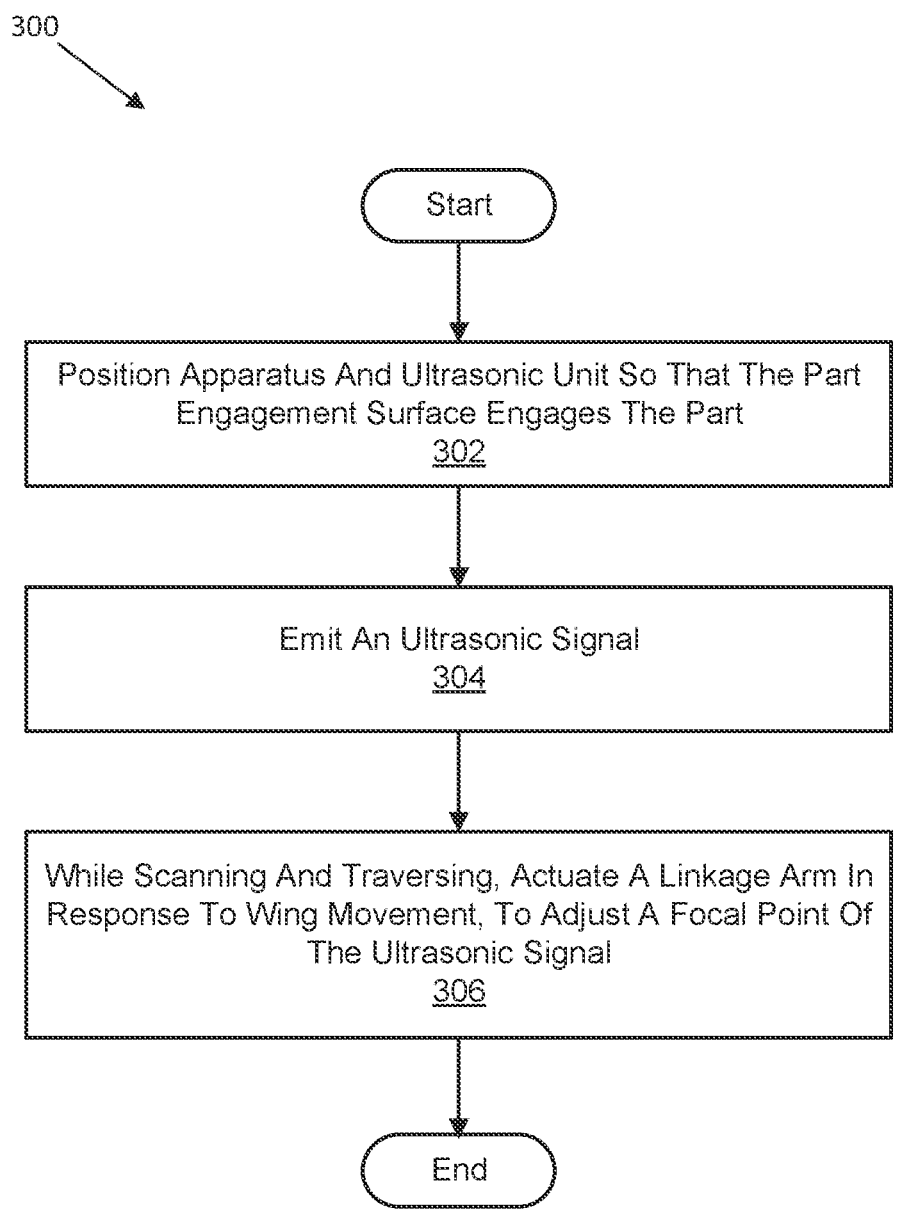
FIG. 14 is a flowchart diagram of a method for ultrasonic testing, according to examples of the subject disclosure.

FIG. 14 illustrates a method 300 of ultrasonic testing. The method 300 includes positioning, at block 302, an apparatus 100 on a part 126 at a joint of the part 126 to contact a part contact surface 106 of a base 102 of the apparatus 100 with the part 126, and to contact a web and a flange with one of the pair of wings 114. The method 300 also includes, at block 304, emitting an ultrasonic signal from the apparatus 100 to a focal point proximate the joint of the part 126, and sliding the apparatus 100 along the joint of the part 126 with the part contact surface 106 in contact with the part 126.

In certain examples, the method 300 further includes, at block 306, actuating a linkage arm, in response to movement of the base 102 relative to the first wing 110 and the second wing 112, to move the sensor carriage 104 of the apparatus 100 relative to the base 102 to adjust a position of a focal point of the ultrasonic signal based on a web to flange angle.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An apparatus for ultrasonic inspection, the apparatus comprising:
   a base;
   a lower coupler block slidably coupled to the base such that the base is translationally movable relative to the lower coupler block;
   a pair of wings rotatably coupled to the lower coupler block at a wing pivot point and pivotable between a first angle and a second angle; and
   a sensor carriage located within the base in a nested arrangement with the sensor carriage and slidably coupled to the base such that the sensor carriage is translationally movable relative to the base, wherein movement of the pair of wings, relative to the base, actuates and moves the sensor carriage, relative to the base.

2. The apparatus of claim 1, further comprising:
   an upper coupler block coupled to the lower coupler block; and
   a pair of linkage arms; and
   wherein each one of the pair of linkage arms has a first end pivotally coupled to one of the pair of wings, and a second end pivotally coupled to the upper coupler block.

3. The apparatus of claim 1, further comprising an upper coupler block coupled to a tool center point of a robotic arm system.

4. The apparatus of claim 1, further comprising an upper coupler block coupled to a handle.

5. The apparatus of claim 1, further comprising an upper coupler block, and wherein, in response to a force applied to the upper coupler block in a direction towards a part, the upper coupler block is configured to cause the pair of wings to open.

6. The apparatus of claim 1, wherein each one of the pair of wings comprises:
   a front side, a back side, a top side, and a bottom side; and
   a slide rail disposed on an interior surface at a non-orthogonal angle with reference to the top side.

7. The apparatus of claim 1, further comprising:
   wherein each one of the pair of wings further comprises:
      a front side, a back side, a top side, and a bottom side; and
      a slide rail disposed on an interior surface at a non-orthogonal angle with reference to the top side; and
   a rod member having a first end and a second end, wherein the first end is slidingly coupled to a first wing slide rail of a first wing of the pair of wings, and the second end is slidingly coupled to a second wing slide rail of a second wing of the pair of wings.

8. The apparatus of claim 1, wherein the lower coupler block further comprises a pair of extension arms, each having a slot for receiving a rod member.

9. The apparatus of claim 1, further comprising an ultrasonic unit mounted to the sensor carriage such that the ultrasonic unit is non-movable relative to the sensor carriage.

10. The apparatus of claim 1, wherein movement of the sensor carriage relative to the base adjusts a focal point of an ultrasonic unit relative to the base.

11. The apparatus of claim 1, further comprising a part contact surface wherein the part contact surface is configured to be slidable along a part being inspected and the sensor carriage is configured to move translationally relative to the base in response to the base and the pair of wings being displaced while sliding in response to a changing web to flange angle of the part being inspected.

12. The apparatus of claim 1, further comprising a fluid port formed in the base and configured to facilitate fluid contact at an ultrasonic unit of the sensor carriage.

13. A system for ultrasonic inspection, the system comprising:
   an apparatus comprising:
      a base comprising a part contact surface;
      a lower coupler block slidably coupled to the base such that the base is translationally movable relative to the lower coupler block;
      a pair of wings rotatably coupled to the lower coupler block at a wing pivot point and pivotable between a first angle and a second angle; and
      a sensor carriage located within the base in a nested arrangement with the sensor carriage and slidably coupled to the base such that the sensor carriage is translationally movable relative to the base, wherein movement of the pair of wings, relative to the base, actuates and moves the sensor carriage, relative to the base;
   a tool configured to receive the apparatus and position the apparatus to provide an ultrasonic signal from an ultrasonic unit and detect a reflected ultrasonic signal at the ultrasonic unit; and
   a controller configured to process the reflected ultrasonic signal received by the ultrasonic unit to determine a presence of an abnormality corresponding to the positioning of the apparatus.

14. The system of claim 13, wherein the tool is configured to position the apparatus using a sliding motion.

15. The system of claim 13, wherein the tool is configured to position the apparatus using a sliding motion of the apparatus in a sliding direction and the sensor carriage is translationally movable in a displacement direction which is non-parallel to the sliding direction.

16. The system of claim 13, wherein the tool comprises a robotic arm having a tool center point.

17. A method of ultrasonic testing, the method comprising:
positioning an apparatus on a part at a joint of the part between a web and a flange such that a first wing of the apparatus contacts the web and a second wing of the apparatus contacts the flange, and wherein the first wing is pivotally coupled to the second wing at a wing pivot point of a lower coupler block of the apparatus;
emitting an ultrasonic signal from the apparatus to a focal point proximate the joint of the part;
sliding the apparatus from the web to the flange through the joint; and
actuating a linkage arm, in response to movement of a base relative to the first wing and the second wing, to move a sensor carriage of the apparatus relative to the base to adjust a position of a focal point of the ultrasonic signal based on a web to flange angle, wherein the sensor carriage is in a nested arrangement with the base.

18. The method of claim 17, further comprising pivoting the first wing and the second wing away from the base.

19. The method of claim 17, further comprising pressing a part contact surface of the base against a surface of the part.

20. The method of claim 17, further comprising testing the joint along a length of the part.

* * * * *